US011240196B2

(12) United States Patent
Stahura et al.

(10) Patent No.: US 11,240,196 B2
(45) Date of Patent: *Feb. 1, 2022

(54) COMMUNICATION USING DNS REPURPOSING

(71) Applicant: Donuts Inc., Kirkland, WA (US)

(72) Inventors: Paul Stahura, Sammanish, WA (US); Christopher L. Cowherd, Jr., Bellevue, WA (US)

(73) Assignee: Donuts Inc., Bellevue, WA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/432,137

(22) Filed: Jun. 5, 2019

(65) Prior Publication Data

US 2020/0127964 A1 Apr. 23, 2020

Related U.S. Application Data

(63) Continuation of application No. 14/569,208, filed on Dec. 12, 2014, now Pat. No. 10,320,739.

(51) Int. Cl.
*H04L 29/12* (2006.01)
*G06F 16/9537* (2019.01)

(52) U.S. Cl.
CPC ...... *H04L 61/1511* (2013.01); *G06F 16/9537* (2019.01); *H04L 61/609* (2013.01)

(58) Field of Classification Search
CPC . H04L 61/1511; H04L 61/609; G06F 17/3087
USPC ...................................................... 709/245
See application file for complete search history.

(56) References Cited

U.S. PATENT DOCUMENTS

| 7,290,008 | B2 * | 10/2007 | Balva .................. G06F 16/9566 707/756 |
| 9,386,042 | B1 | 7/2016 | Stoner et al. |
| 9,661,108 | B2 * | 5/2017 | Treuhaft ............. H04L 63/1441 |
| 2004/0215707 | A1 | 10/2004 | Fujita et al. |
| 2005/0039017 | A1 | 2/2005 | Delany |
| 2007/0033645 | A1 | 2/2007 | Jones |
| 2008/0086574 | A1 * | 4/2008 | Raciborski .......... H04L 61/1511 709/245 |

(Continued)

FOREIGN PATENT DOCUMENTS

KR       20060130811 A       12/2006

OTHER PUBLICATIONS

International Search Report and Written Opinion of International Application No. PCT/US2015/063321; dated Apr. 12, 2016; 13 pages.

*Primary Examiner* — Kevin T Bates
*Assistant Examiner* — Ronak Patel
(74) *Attorney, Agent, or Firm* — Perkins Coie LLP

(57) ABSTRACT

Technology for communicating by embedding messages in DNS requests/responses is disclosed. In many cases it is desirable for a device to communicate without that device having to supply network credentials. In some network environments, credentials are not required to send or receive DNS messages. The question section of a DNS request message may include a message for a destination DNS server and a query domain which, when using standard DNS routing, will result in the DNS request being directed to the intended destination DNS server. The message may be encoded in such a way that an algorithm run by the destination DNS server is able to parse the message from the DNS request.

21 Claims, 6 Drawing Sheets

(56) References Cited

U.S. PATENT DOCUMENTS

| | | | |
|---|---|---|---|
| 2008/0104182 A1* | 5/2008 | Jimmei | H04L 63/1458 709/206 |
| 2008/0140847 A1 | 6/2008 | Almog | |
| 2010/0125673 A1* | 5/2010 | Richardson | H04L 45/741 709/239 |
| 2011/0119306 A1* | 5/2011 | Patil | H04L 63/0236 707/783 |
| 2012/0096166 A1* | 4/2012 | Devarapalli | H04L 67/1002 709/226 |
| 2012/0324113 A1* | 12/2012 | Prince | H04L 69/40 709/226 |
| 2013/0036307 A1 | 2/2013 | Gagliano et al. | |
| 2013/0066842 A1* | 3/2013 | Yang | H04L 61/1511 707/692 |
| 2013/0111066 A1* | 5/2013 | Vempati | H04L 61/1511 709/245 |
| 2013/0170348 A1 | 7/2013 | Luna et al. | |
| 2013/0275574 A1* | 10/2013 | Hugard, IV | H04L 63/00 709/224 |
| 2014/0082348 A1* | 3/2014 | Chandrasekaran | H04W 12/02 713/150 |
| 2014/0237564 A1* | 8/2014 | Dudziak | H04L 63/08 726/6 |
| 2015/0026341 A1* | 1/2015 | Blacka | H04L 63/168 709/225 |
| 2016/0028607 A1 | 1/2016 | Weill et al. | |

* cited by examiner

COMMUNICATION USING DNS REPURPOSING

CROSS-REFERENCE TO RELATED APPLICATIONS

This application claims priority to, and is a continuation of, U.S. patent application Ser. No. 14/569,208, filed Dec. 12, 2014, entitled "COMMUNICATION USING DNS REPURPOSING," which is herein incorporated by reference in its entirety.

BACKGROUND

As the Internet becomes integrated into almost every aspect of human life, the diversity of devices that accumulate information is growing. Both input and output devices (such as light bulbs and thermostats) are being connected to networks, including the Internet, and added to everything from cars to packing slips. Such devices typically transmit and receive a small amount of information and employ a number of techniques to communicate with data repositories. For example, devices may be wired to a network to communicate with a server, establish a short range communication transmission with other devices such as through infrared or Bluetooth communication, communicate through a local WiFi network using a standard port such as port 21, 25, or 80 of the TCP/IP protocol, or connect to a cellular communication system.

Each of these communication techniques may include special setup such as attaching wires, providing a specialized transmitter/receiver within a short range of the device, or having network authorization such as, in an open network, using a router configuration to allow access or authorization information such as a password. In addition, some of these communication techniques may include significant overhead, such as initialization handshakes, transmission verification, and bulky, complicated or expensive hardware, while others have very limited range and are unreliable. As the number and distribution of these devices increase, and as the size of these devices decrease, these limitations present a barrier to communication and increased insecurity.

DETAILED DESCRIPTION

Figure 1:
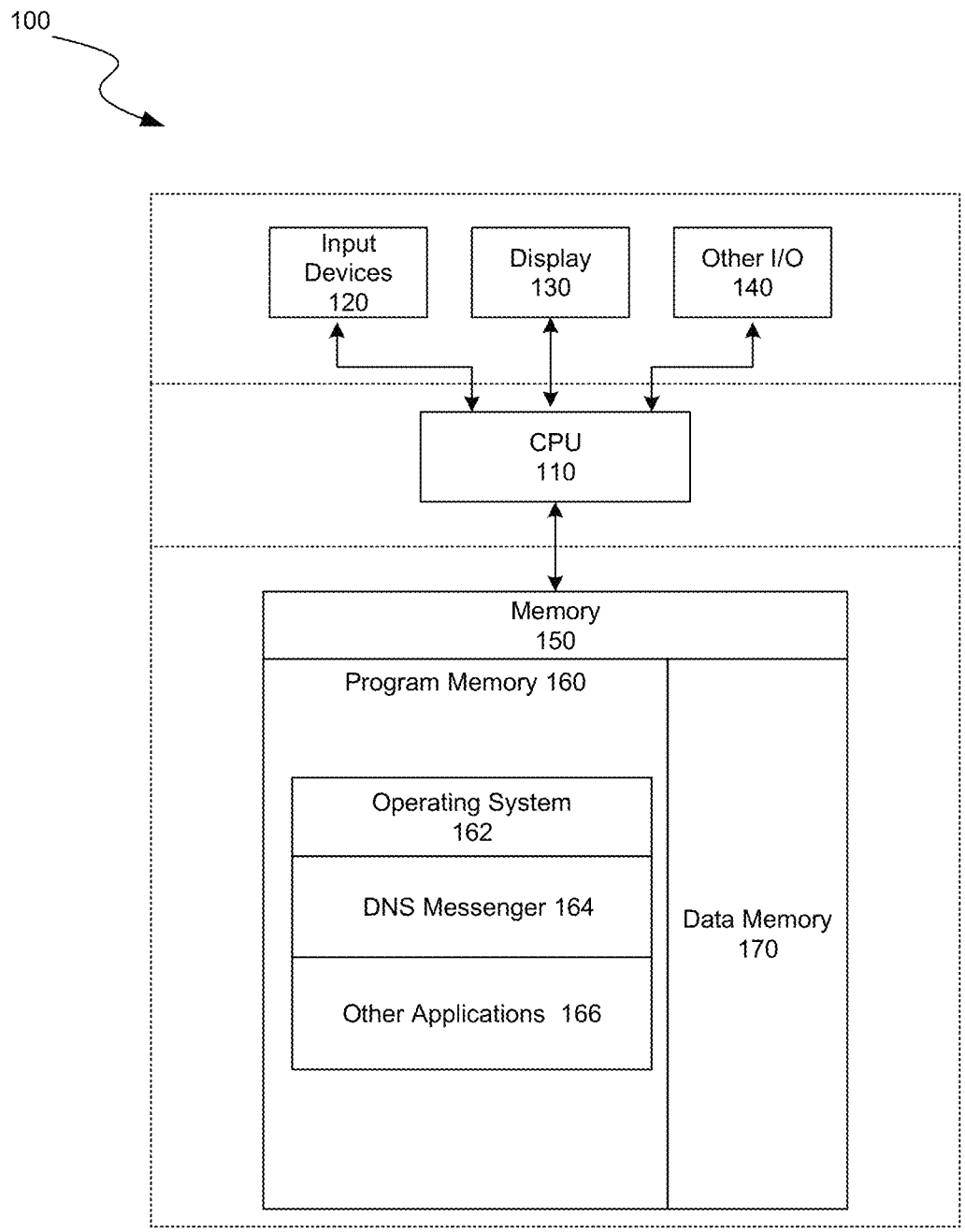
FIG. 1 is a block diagram illustrating an overview of devices on which some embodiments of the disclosed technology may operate.

While devices are often in range of networks such as WiFi, these networks often require authentication codes before they permit general communication. However, it may be desirable for certain devices to be able to communicate on these networks without providing these codes. For example, a transceiver may be embedded in a suitcase lock and be configured to transmit its GPS coordinates. However, due to the size of the device, it may not be possible, may be prohibitively expensive, or may be too insecure to include security codes or security modules in the device to protect network authentication information. Devices that contain security codes may be compromised (i.e., "hacked") by bad actors to obtain the security codes, while devices that contain no such information would make any such hacking worthless. Due to the multiplicity of such devices at an airport, for example, configuring a router to accept communications from these devices but not unauthorized devices may not be feasible. Furthermore, some devices have a very limited battery life that can be drained by extensive handshake and authentication procedures. Thus, being able to connect and communicate over secured networks without requiring the usual authentication codes is desirable. Some networks connected to the Internet do not require security codes to use the domain name system of the Internet, while those same networks require security codes to use the "world wide web." Systems and methods for communication by embedding data in Domain Name System ("DNS") messages is provided.

DNS is a system that provides mappings from a domain name to a corresponding IP address. As discussed in more detail below in relation to FIG. 6, DNS messages may comprise a transaction ID, a flags section, a section specifying the number and type of questions/answers in the DNS request/response, and a questions/answers section. When a device submits a DNS request it is routed to a DNS server for handling. This routing occurs by deconstructing the domain in the question portion of the DNS request, from right to left, into one or more sub domains. For example, a domain "service.iot.example" has a top-level domain ".example," a sub domain "iot.example," and a further sub-domain of "service.iot.example," For each domain label, there is one or more DNS servers that have been designated as authoritative for translating that domain name into an IP address. When a DNS request is sent to a first DNS server, depending on the configuration of the request and whether the first DNS server is authoritative for the root domain, the first DNS server may respond with an IP address for which the first DNS server has a mapping corresponding to the requested domain. Alternatively, the first DNS server may forward the request to one or more second DNS servers that may have this mapping or be authoritative for this domain. The first DNS server may select the second DNS servers by determining the servers designated for the top-level domain of the domain in the DNS request and querying those servers for the authoritative server(s) for the root domain in the DNS request. Due to this standard for DNS processing, unless a domain specified in a DNS request has been cached, as discussed below, a DNS request sent from anywhere in the world will be transmitted to the server(s) designated for the domain specified in the DNS request.

When DNS responses are processed, various systems, including the system that initiated the DNS request, may cache the mapping of the requested domain to an IP address so that subsequent requests for that domain may be resolved by a system earlier in the chain of devices that may respond to a DNS request. When a remote device connects to a network and transmits a DNS request for resources within a particular domain, remote device may be provided with alternate content, such as a website requesting authentication information or acceptance of a terms of use policy. However, the DNS request may still be handled using the normal DNS request system. Otherwise, if a different IP address were provided to the requesting client computing system, such as the IP address of the authentication page, the client computing system may cache that incorrect IP address, a circumstance known as cache poisoning. If this happens, further requests by the client computing system for that domain may be transmitted to the incorrect IP address until the time to live ("TTL") for that entry in the client computing system's cache expires. Thus, DNS requests provide a conduit to transmit messages to DNS servers without being required to provide the usual authentication information.

The technology disclosed herein leverages, in both open and secure networks, this DNS conduit and the DNS system for routing DNS requests to provide communication between remote devices and DNS servers. This is accomplished by remote devices connecting to a network that, whether secured or not, does not restrict DNS requests. This type of network is referred to herein as an "open DNS network." A DNS request may be generated to send to a particular DNS server over an open DNS network. In a DNS request without an embedded message, a question section of the DNS request specifies a particular domain to map an IP address. In the generated DNS request for embedded messaging, the question section of the DNS request may also include data to be transmitted with a query domain. As used herein, a "query domain" is the right-most portion of a question that will be used to route the DNS request to a DNS server authoritative for providing a mapping between the query domain and an IP address. For example, a device may be configured to send messages to a destination DNS server controlled by Company X. Company X may establish a DNS server that is authoritative for the domain "service.iot.example." The device may create a DNS request that will reach this DNS server by generating the question portion as "<message>.service.iot.example," where "service.iot.example" is the query domain. When this DNS request is transmitted, the DNS system will route this DNS request to the Company X destination DNS server authoritative for the service.iot.example domain. This routing can occur by passing the DNS request through various recursive resolvers (i.e. intermediary server), one of which ultimately communicates with the authoritative server.

The <message> in the question portion of the DNS request may be encoded in such a way that an algorithm run by a destination DNS server is able to parse the message from a DNS request. For example, a device attached to a package may transmit GPS coordinates, where the device has variables: <deviceID=ABC>, <encoding=3(GPS)>, <longitude=39.658201>, and <latitude=−104.969940>. This device may generate the message "ABC0.030.039d6582010.0n104d969940." Continuing the above example, the question in the DNS message may then be created as: "ABC0.030.039d6582010.0n104d969940.service.iot.example." The destination DNS server may be configured to select the GPS decoding algorithm to parse the longitude and latitude for the specified device. The destination DNS server could then store or otherwise use these coordinates, such by providing them to a package tracking database.

The specifications of the current DNS system state that the full domain name in a DNS request may not exceed 253 characters, in its textual representation. Therefore, the textual version of the encoded message combined with the query domain must be 253 characters or less or must be partitioned into multiple DNS questions. The multiple questions may be transmitted in a single DNS request or may be transmitted in multiple DNS requests. This size limitation may change or be removed in future implementations of the DNS system in which case the combined message and query domain may exceed 253 characters. Furthermore, in some implementations, the entire query portion of a DNS request can be used without specifying a query domain. This can be accomplished if the device sending the DNS request, which uses the UDP protocol, addresses UDP packets directly to the destination DNS server. The sending device may be pre-programmed with an IP address for the UDP packets or it may send an initial normal DNS request to retrieve the IP address of the destination DNS server.

Several embodiments of the described technology are discussed below in more detail in reference to the figures. Turning now to the figures, FIG. 1 is a block diagram illustrating an overview of devices 100 on which some embodiments of the disclosed technology may operate. The devices may comprise hardware components of a device 100 for generating embedded DNS requests or of a server 100 for responding to embedded DNS requests. Device 100 may include one or more input devices 120 that provide input to the CPU (processor) 110, notifying it of actions. The actions are typically mediated by a hardware controller that interprets signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or another input device.

CPU 110 may be a single processing unit or multiple processing units in a device or distributed across multiple devices. CPU 110 may be coupled to other hardware devices, for example, with the use of a BUS, such as a PCI BUS or SCSI BUS. The CPU 110 may communicate with a hardware controller for devices, such as for a display 130. Display 130 may be used to display text and graphics. In some examples, display 130 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), one or more signal lights, and so on. Device 100 may also include other I/O devices 140, also coupled to the CPU 110. Other I/O devices 140 may include devices such as a network adapter, video card, audio card, USB, GPS receiver, firewire receiver, camera, printer, speakers, CD-ROM drive, DVD drive, disk drives, Blu-Ray devices, or various sensors such as for heat, moisture, altitude, radiation, pressure, electrical flow, or any other type of sensor. I/O 140 may include additional communication devices capable of communicating wirelessly or wire-based with a network node. The communication devices may communicate with another device or a server through a network using a network protocol such as TCP/IP or UDP.

The CPU 110 has access to a memory 150. A memory includes one or more of various hardware devices for volatile and non-volatile storage, and may include both read-only and writable memory. For example, a memory may comprise random access memory (RAM), read-only memory (ROM), and writable non-volatile memory, such as flash memory, hard drives, floppy disks, CDs, DVDs, magnetic storage devices, tape drives, device buffers, and so forth. A memory is not a propagating electrical signal divorced from underlying hardware and is thus non-transitory. The memory 150 may include program memory 160 that contains programs and software, such as an operating system 162, DNS Messenger 164, and any other application programs 166. The memory 150 may also include data memory 170 that stores any configuration data, settings, domain-to-DNS server mappings, user options and preferences that may be needed by the program memory 160, or any element of device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, embedded sensor devices, or distributed computing environments that include any of the above systems or devices and the like.

Figure 2:
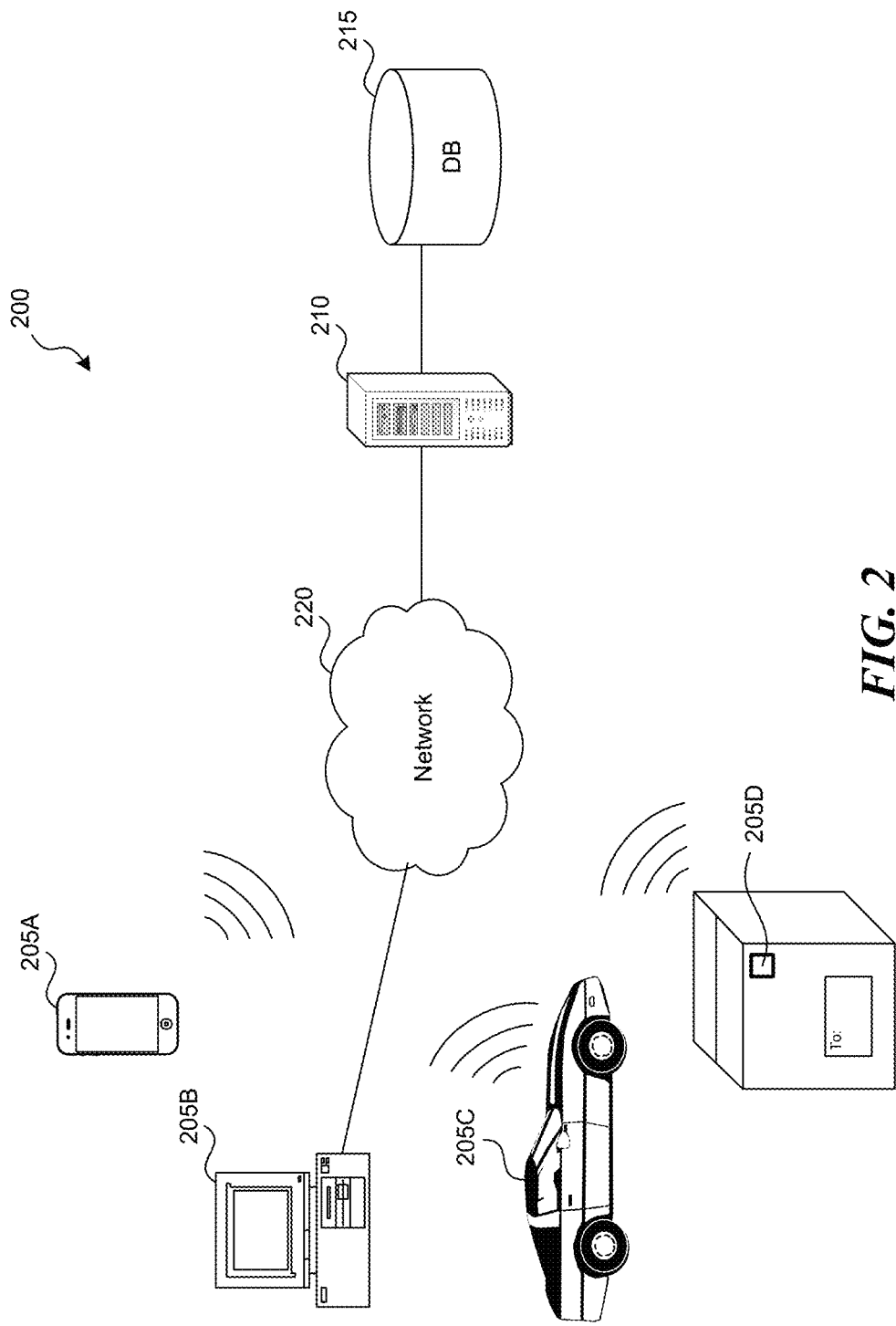
FIG. 2 is a block diagram illustrating an overview of an environment in which some embodiments of the disclosed technology may operate.

FIG. 2 is a block diagram 200 illustrating an overview of an environment in which some embodiments of the disclosed technology may operate. An environment for implementing the technology may include one or more client computing devices 205A-D, examples of which may include device 100. In some implementations, a device 205 may comprise an interactive computing system such as a personal computer or mobile phone. In some implementations, a device 205 may comprise micro-electronics such as a processor/GPS/transceiver system embedded in a package or may comprise a sensor system, such as for a vehicle. Client computing devices 205 may operate in a networked environment using logical connections, through network 220, to one or more remote computers such as server computing device 210. Though server computing device 210 is displayed logically as a single server, server computing device 210 may be a distributed computing environment encompassing multiple machines located at the same or geographically disparate physical locations. Client computing devices 205 and server computing device 210 may each act as a server or client to other server/client devices. Server 210 may connect to a database 215. Database 215 may warehouse information such as DNS mappings and DNS device information. Though server computing device 210 and database 215 are displayed logically as a single machine, server computing device 210 and database 215 may each be a distributed computing environment encompassing multiple machines located at the same or geographically disparate physical locations.

Network 220 can be a local area network (LAN) or a wide area network (WAN) and may also be other wired or wireless networks. The client computing devices 205 can be connected to network 220 through a network interface, such as by wired or wireless communication.

Figure 3:
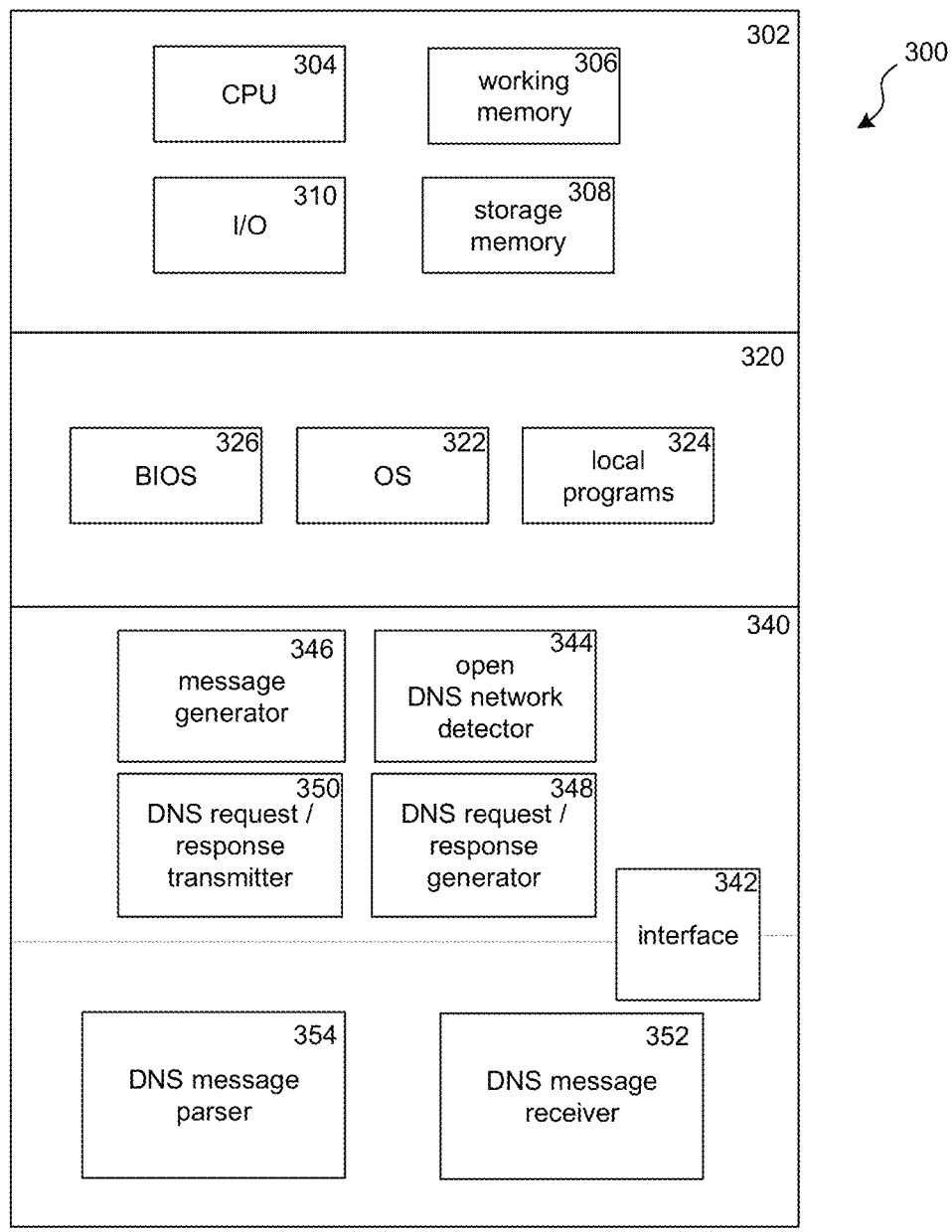
FIG. 3 is a block diagram illustrating components that, in some embodiments, may be used in a system implementing the disclosed technology.

FIG. 3 is a block diagram illustrating components 300 that, in some embodiments, may be used in a system implementing the disclosed technology. The components 300 include hardware 302, general software 320, and specialized components 340. As discussed above, a system implementing the disclosed technology may use various hardware including a central processing unit 304, working memory 306, storage memory 308, and input and output devices 310. Components 300 may be implemented in a client computing device such as client computing devices 205 or on a server computing device, such as server computing device 210.

General software 320 may include various applications including an operating system 322, local programs 324, and a BIOS 326. In some implementations, devices 300 may be configured with specialized circuitry or a specialized implementations of one or more of: operating system 322, local programs 324, and BIOS 326 for use by special purpose computing devices, such as consumer electronics, microdevices or low power devices. One or more of specialized components 340 may be subcomponents of a general software application 320, such as a local program 324. Alternatively, one or more of specialized components 340 may be specialized circuitry. Specialized components 340 may include components for a device to initiate embedded DNS messaging or for a server to respond to embedded DNS messaging. Components to initiate embedded DNS messaging may include open DNS network detector 344, message generator 346, DNS request/response generator 348, and DNS request/response transmitter 350. Specialized components 340 may also include components to handle an embedded DNS message, including DNS message receiver 352 and DNS message parser 354. Specialized components 340 may also include hardware ports or software functions that provide paths to control and provide data to other specialized components 340. Some components identified as used for embedded DNS messaging may overlap. For example, message generator 346 and DNS request/response generator 348 may be implemented by a single component or module.

When initiating communication using embedded DNS messages, an initiation command and data to be transmitted may be received by interface 342. Open DNS network detector may then report open DNS networks to which device 300 can connect. Message generator 346 may receive the data to be transmitted and generate one or more messages encoding the data to be transmitted such that the messages may be embedded in the question section of a DNS request and parsed by an intended recipient DNS server. Message generation is discussed in more detail below in relation to FIG. 4.

The generated message(s) are then embedded in one or more DNS requests or responses created by DNS request/response generator 348. DNS requests may be configured to reach a particular DNS server by specifying the query domain in the DNS request for which the intended destination DNS server is authoritative. DNS request generation is discussed in more detail below in relation to FIG. 4. DNS response generation is discussed in more detail below in relation to FIG. 5. The generated message(s) are then embedded in the generated DNS request(s)/response(s), which are transmitted as normal DNS request(s)/response(s) by DNS transmitter 350.

Using standard DNS routing, a transceiver of the destination DNS server may receive the DNS request. A "destination DNS server," as used herein, may refer to a server or group of servers that receive a DNS request, or another device that receives at least a part of such a DNS request from a DNS server and performs further processing on, or storage of, that part of a received DNS request. The destination DNS server may use a message parsing component to extract and store the message embedded in the DNS request. Server processing of a DNS request with an embedded DNS message is discussed in more detail below in relation to FIG. 5.

While in some implementations of communication between the remote device and the destination DNS server only flow from the remote device to the destination DNS server, in some implementations communication is two-way, while in still further implementations, communication may include three or more devices, where a message from the remote device to the DNS server may cause the DNS device or server to communicate with another remote device, either through embedded DNS messages or through other communication protocols. Whether a DNS server sends a responding message and where such a message is sent may be specified by settings of the DNS server or may be specified by parameters in an embedded DNS request. Where the destination DNS server provides an embedded DNS response, the transceiver of the destination DNS server may transmit this embedded DNS response as it would a normal DNS response.

Embedded DNS responses may be received at the remote device through interface 342 and passed to DNS message receiver 352 which may determine that the message is an embedded DNS message. DNS message parser 354 may then extract and store the message embedded in the DNS response, which may be passed back through interface 342 to other components for further processing.

Those skilled in the art will appreciate that the components illustrated in FIGS. 1-3 described above, and in each of the flow diagrams discussed below, may be altered in a variety of ways. For example, the order of the logic may be rearranged, steps may be performed in parallel, illustrated logic may be omitted, other logic may be included, etc.

Figure 4:
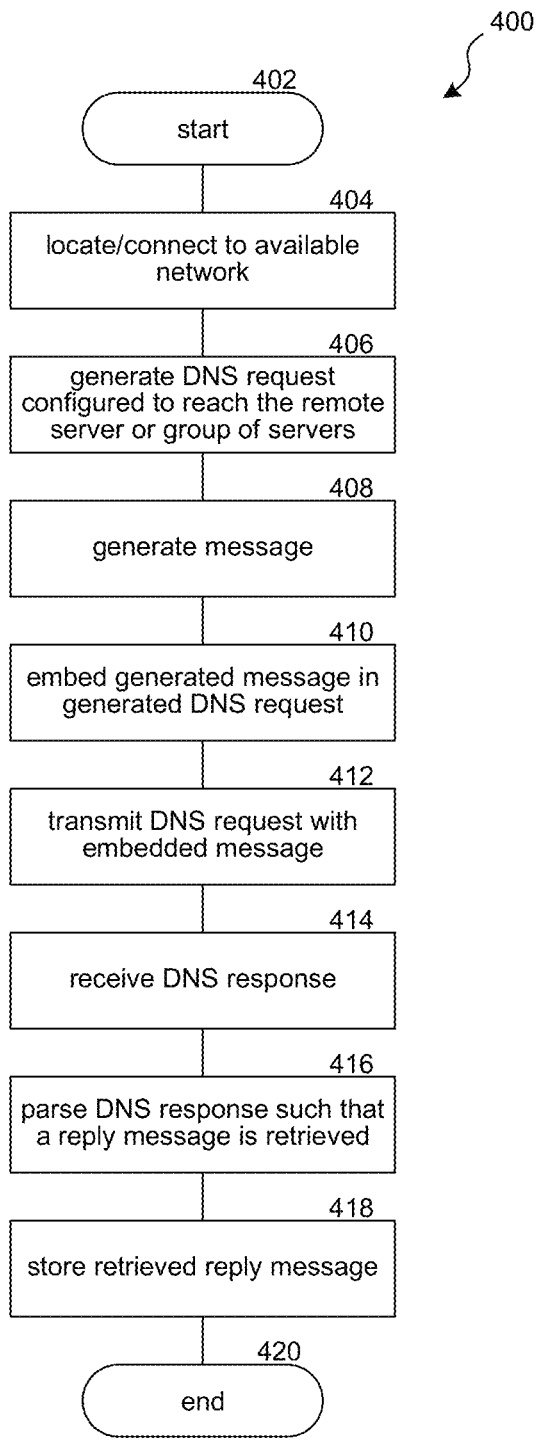
FIG. 4 is a flow diagram illustrating a process used in some embodiments by a remote device for communicating by embedding data in DNS messages.

FIG. 4 is a flow diagram illustrating a process 400 used in some embodiments by a remote device for communicating by embedding data in DNS messages. The process begins at step 402 and continues to step 404. At step 404 an open DNS network is found. Step 404 may occur at any point prior to the transmission of DNS request in step 412. In some implementations, step 404 may be performed implicitly by finding or connecting to an available network, with the assumption that the found network is an open DNS network.

Next at step 406, the process generates a DNS message configured to reach a destination DNS server. This may be accomplished by generating a DNS request that specifies, in its question section, the query domain for which the destination DNS server has been designated as responsible for handling DNS requests. To obtain this query domain, a system performing process 400 may be able to query another device or may be pre-configured with a list of one or more domains to use in embedded DNS requests. In some implementations, a device may have a selection algorithm which chooses one of multiple available domains to use in creating a DNS request. Such a selection algorithm may be based, for example, on a mapping of query domains to: a destination DNS server, a type of message being sent, a time period, a device location, the content of the message, or any other qualifier which may be used to distinguish which server an embedded DNS message should be sent to. In some implementations, a device may be configured to always send embedded DNS requests to the same destination DNS server, in which case a selection algorithm and/or mapping are not required, but may still be used.

At step 408 the process generates a message to send to the destination DNS server. Currently, the maximum size of a domain string in a DNS question is 255 octets and may not exceed 253 characters in its textual representation. Therefore, in some implementations, the maximum size of a message which may be embedded in a single DNS question is 253 minus the number of characters used in step 406 to specify the query domain. Furthermore, each label in a DNS request subdomain is limited to 63 octets. In some implementations, process 400 may be able to transmit messages larger than the maximum size that may be embedded in a single DNS request by distributing the message across multiple DNS requests or across multiple questions in a single DNS request. In these implementations, an algorithm at the recipient DNS server may be configured to compile the messages from multiple DNS requests back into the full message.

In some implementations, the entire domain portion of a DNS request can encode a message without specifying a query domain. For example, the device sending the DNS request, using the UDP protocol, can format UDP packets as DNS requests that are addressed directly to the destination DNS server. The sending device may be pre-programmed with an IP address of the destination DNS server or it may send an initial normal DNS request to retrieve the IP address of the destination DNS server. The destination DNS server may be configured to interpret the entire binary representation of the DNS query as data, not requiring strict adherence to the DNS query format or protocol. In addition, the entire question section of the DNS request can be used for message data, providing an additional 4 octets of message space. Furthermore, the UDP packets may be configured to be compliant with the DNS specification. This permits these packets to bypass any deep packet analysis that could throw out packets that are determined to be invalid. Additionally, UDP packets can be raw UDP packets sent over port 53 for DNS requests.

In some implementations, devices sending data using DNS requests can be configured to use different UDP packet configurations for various situations. The configuration selection may be based on factors such as a determination of types of analysis the UDP packets will be subject to. In some implementations, a device sending data using DNS requests can perform an initial test to determine an acceptable format for packets to maximize data capacity while still reaching the intended destination DNS server. For example, the device can test various packet configurations, and if the device receives a response, it can determine that the format used for the test is acceptable.

In some implementations, the generated message may specify, in addition to or in place of the data to be transmitted, information about the message or device sending the message. This information may include fields such as a sending device ID, a type of encoding algorithm to use in parsing the message, whether the message is part of a sequence of messages, and, if so, a sequence number. In addition to or instead of a data payload, the generated message may include one or more instructions for the destination DNS server. For example, instructions may include whether or not the destination DNS server should reply to the DNS request; if the destination DNS server should reply, whether the reply should be sent to the device originating the embedded DNS request or another device; when to send a reply such as immediately, at a specific time, or when another embedded DNS message is received from this or another device; or how to send a reply, such as using embedded DNS messaging or another technique. Such instructions may additionally trigger any other pre-arranged action or call a function of the destination DNS server.

The content of the message may be encoded using one or more encoding algorithms. The result of encoding the message with an encoding algorithm will be that the destination DNS server will be able to parse information from the DNS request. The encoding may use standard encoding techniques, such as XML, or may use other proprietary or non-proprietary schemes. In some implementations, the encoding can be modified to conform to DNS request requirements, such as only using letters and numbers. In some implementations, this can be accomplished by using alpha-numeric codes to represent non-alpha-numeric characters and escape codes to signify when one of the alpha-numeric codes occurs in a message without indicating a non-alpha-numeric character. In some implementations, the encoding may be pre-arranged with one or more destination DNS servers so that the message need not contain a signal of the type of encoding used.

In some implementations, the one or more types of encoding may be signaled as part of the message. In some implementations, the encoding algorithm used may encode a first part of the message using a generic algorithm, where the first part of the message identifies a further message type or type of decoding algorithm. The destination DNS server may be configured to parse the first part of the encoded message to determine which of several decoding algorithms to choose to decode the remainder of the message. For example, a transmitting device on a car may encode a first part of a message for GPS location, such as "<deviceID>0.03" where the destination server would be configured to find the code after the first "0.0" marker, and use a GPS decoder where the code it finds is "3." The remainder of the message may have a <longitude> and <latitude> portion encoded in a way that the GPS decoder used by the destination DNS server would be able to parse.

As a further example, a transmitting device in a garage door opener may encode a message instructing a command to be sent to a garage door controller. A first part of the message may be "<deviceID>0.05," where the destination server would be configured to find the code after the first "0.0" marker, and use a decoder for instructions where it finds code "5." The remainder of the message may have an <instruction1> and <instruction2> portion, encoded in a way that the instructions decoder would be able to parse. The <instruction1> could amount to "setCommand to 'openGarageDoor,'" and the <instruction2> could amount to "run generateApplianceCommand(myHouseID, garageDoorID, command)." The DNS question, encoding these instructions, could then be: "ABC0.050.0setCommand111openGarageDoor0.0run111 generateApplianceCommand 9myHouseID8garageDoorID8command0.service.iot.example." Based on this DNS question, the destination DNS server could select the instructions decoder to determine the instructions to run and invoke functions of the destination DNS server to contact the appliance uniquely identified by the combination myHouseID/garageDoorID, and send that device a "open garage door" command. Depending on the configuration sending the "open garage door" command may be through embedded DNS messaging or may employ another messaging system.

Any type of data can be encoded from any DNS enabled device. For example, GPS sensing devices may be affixed to a mobile item to report on the item's location; appliances and electronics may be coupled to transceivers to report status, power usage, or other data; personal devices such as fitness trackers may be enabled with a DNS sending/receiving system to report gathered exercise and biological data; or devices with a camera may transmit pictures or video. In addition, other devices intended to operate over existing networks, such as appliance controllers, may be configured to use embedded DNS messaging to eliminate the need to entrust such devices with network credentials. Further examples of DNS messaging devices include: a remote control device; a suitcase; a food package or carton; a mail service letter or package; an item tracking device; a vehicle such as a bicycle, bus, airplane, drone, skateboard; sports equipment such as a ball, skis, or surfboard; safety equipment such as a seatbelt, life preserver, or helmet; a fitness, personal health, or activity tracker; a light bulb; a lock such as a pad lock, deadbolt, doorknob, or key fob system; an HVAC system or control such as a thermostat, a furnace, a water heater, an air-conditioner, or another heat generating or sensing device; a smartphone; a wearable device such as a wristwatch, ring or other jewelry, or other wearable sensors such as for body temperature, heart-rate, UV, location, sound, or vision; an article of clothing with embedded DNS capabilities such as a shirt, shoe, eyeglasses, a helmet, hat, or hearing aid; an ingestible or implanted device for humans or animals such as a pacemaker or micro-chip tracker/identifier; a battery; a camera; a microphone; a video game controller; an actuated or sensing window, window shutter, or door; a gas/air quality detector such as for smoke, carbon monoxide, or carbon dioxide; a plumbing fixture such as a showerhead, toilet, urinal, faucet, or sink drain; a home security sensor; a doorbell; a beacon; a toy; a keychain; a wallet or electronic credit card; a baby or older adult monitor; a nightlight; an irrigation system; a moisture or plant sensing device; a floor mat sensor; a human presence detector such as a facial recognition detector; a motion sensor; a wall outlet; a speaker or earphones; a weather sensor; or a kitchen apparatus such as a stove, pot or pan, or food processing device.

At step 410, the generated message may be embedded in the DNS request. In some implementations, this may occur by concatenating the generated message before a "." and then concatenating this string before the query domain in the generated DNS request. In implementations where the generated message is larger than the maximum size which may be embedded in a single DNS request, embedding the message may comprise splitting the message into multiple parts, adding each part to a separate message, setting a multiple request flag, and specifying in each message a sequence number for each of the multiple DNS requests.

At step 412, the DNS request, now embedded with the generated message, is transmitted as a standard DNS request. In some implementations the query domain of the DNS message may not be unique to the message to be transmitted, such as if the query domain is reused by this device, if another device may have recently used this query domain, or if this DNS request is part of a sequence of messages to transmit an oversized message. In these instances, process 400 may wait to transmit the DNS request until the TTL for DNS responses that may have been cached has expired. For example, the destination DNS server may be configured to set a TTL for DNS responses at 10 seconds. Process 400 may then be configured to wait 10 seconds before transmitting a DNS request to this destination DNS server.

Steps 414-418 may be performed in implementations where the DNS communication between the originating device and the destination DNS server is two-way. At step 414, an embedded DNS response is received. At step 416, the answer portion of the DNS response may be parsed to retrieve the message embedded in the response. Parsing the DNS response may use a pre-arranged decoding algorithm to determine the meaning of the embedded message. The message may be encoded using a system such as XML, and may be a proprietary encoding system. Furthermore, the answer may contain one data block where parsing comprises simply extracting the entire data block. In some implementations, process 400 may have access to multiple decoding algorithms, one or more of which may be selected based on factors such as an indicator in the DNS response, the DNS server that sent the DNS response, when the response was received, or other factors. At step 418, the parsed reply message is stored either in a storage device such as flash or a hard drive, or in operational memory for further processing. Process 400 then continues to step 420, where it ends.

Figure 5:
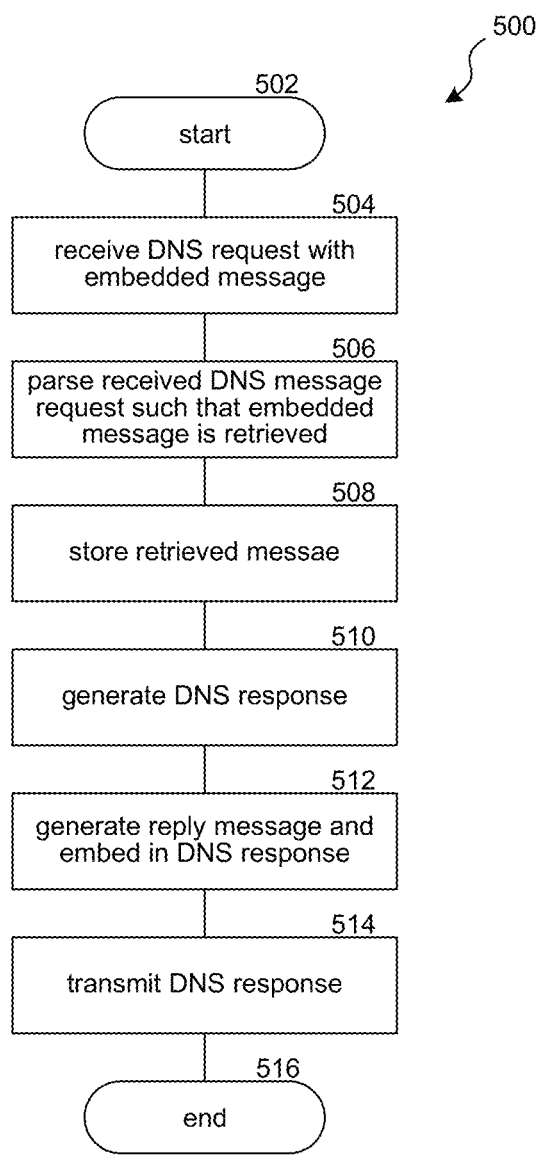
FIG. 5 is a flow diagram illustrating a process used in some embodiments by a destination DNS server for communicating by embedding data in DNS messages.

FIG. 5 is a flow diagram illustrating a process 500 used in some embodiments by a destination DNS server for communicating by embedding data in DNS messages. Process 500 begins at step 502 and continues to step 504. At step 504, the destination DNS server receives a DNS request with an embedded message. The destination DNS server may identify a DNS request based on a recognition that at least a part of the query domain is part of an embedded DNS communication system, based on a flag set in the DNS request, due to the destination DNS server being configured to exclusively handle embedded DNS requests, or based on the source of the DNS request.

At step 506, the received DNS request is parsed such that the message embedded in the DNS request is retrieved. This may include retrieving the message portion from the question string by removing the query domain from the question portion of the DNS request. In some implementations, this may also include further parsing the message portion. As discussed above in relation to step 408, the message embedded in the DNS request may have been encoded using one or more encoding algorithms. A matching decoding algorithm may be used to parse out the elements of the message. For example, the DNS server may be configured to use a default decoding algorithm, may have access to a mapping of one or more decoding algorithms to use for DNS requests from a particular source, or may read a portion of the DNS request that identifies the decoding algorithm to use.

Once the message has been parsed, process 500 stores the retrieved information at step 508. This may include writing the message data to operational memory such as registers, flash, or RAM, or may include saving the message data to storage such as a local drive, sending the data to a database, or sending the data to another system for further processing.

Steps 510-514 may be performed in implementations where DNS communication with the destination DNS server is either two-way with the originating device or multi-way with other DNS devices. At step 510, the DNS server generates a DNS response. In some implementations, sending a DNS response is done by default, based on the content of a DNS request. The DNS server may be configured to respond to a DNS request by sending a DNS response to the originating device or to a second device. Sending a response to a second device may be in response to the original DNS request, or the DNS server may wait until a second DNS request is received from the second device, then send a response based on one or both of the first DNS request and the second DNS request. In some implementations, a message to embed in the DNS response may be larger than a maximum allowable response size. To transmit this type of large message it may be split into multiple messages. These multiple messages may be distributed across multiple answers in a single DNS response or across multiple DNS responses. When the message is distributed across multiple DNS responses, each response prior to the one containing the last block of the message may be configured to cause the recipient DNS device to send a new DNS request to the DNS server. The DNS server can then respond to each of these requests by embedding the next block of the message.

In some implementations, the DNS response may be configured to set a specific TTL. This may be a relatively low TTL as compared to a normal DNS response, such as 0, 1, or 10 seconds. This may be the minimum TTL allowed by the DNS system. By specifying a low TTL, devices along the network path between the DNS server and the recipient of the DNS response which cache DNS mappings will be unlikely to have saved the mapping between the query domain of the DNS request and the answer in the DNS response of a subsequent DNS request is sent to the same query domain. This prevents an intermediate device from attempting to reduce network traffic by intercepting future DNS requests to a previously used query domain and responding with the answer from the previous DNS request without passing the DNS request to the destination DNS server.

At step 512, the DNS server may create a response message to embed in the answer portion of the generated DNS response. Similarly to step 408 above, this may be performed using one or more encoding algorithms such that the recipient of the DNS response can use a decoding algorithm to parse the message from the DNS response, as discussed in step 416 above. A DNS response may then be created using the generated message in place of the domain-to-IP-address mapping which would appear in a non-embedded DNS response. Unlike DNS requests, however, DNS responses are transmitted to an originator of a DNS request, often based on IP, MAC, and TCP/UDP headers of the DNS request, and thus routing of the DNS response is not based on the content of the answer section of the DNS message. Therefore the message to embed in the DNS response may use the entire portion of the answer that would contain the domain-to-IP-address mapping in a non-embedded DNS response. At step 514, process 500 transmits the DNS response.

Figure 6:
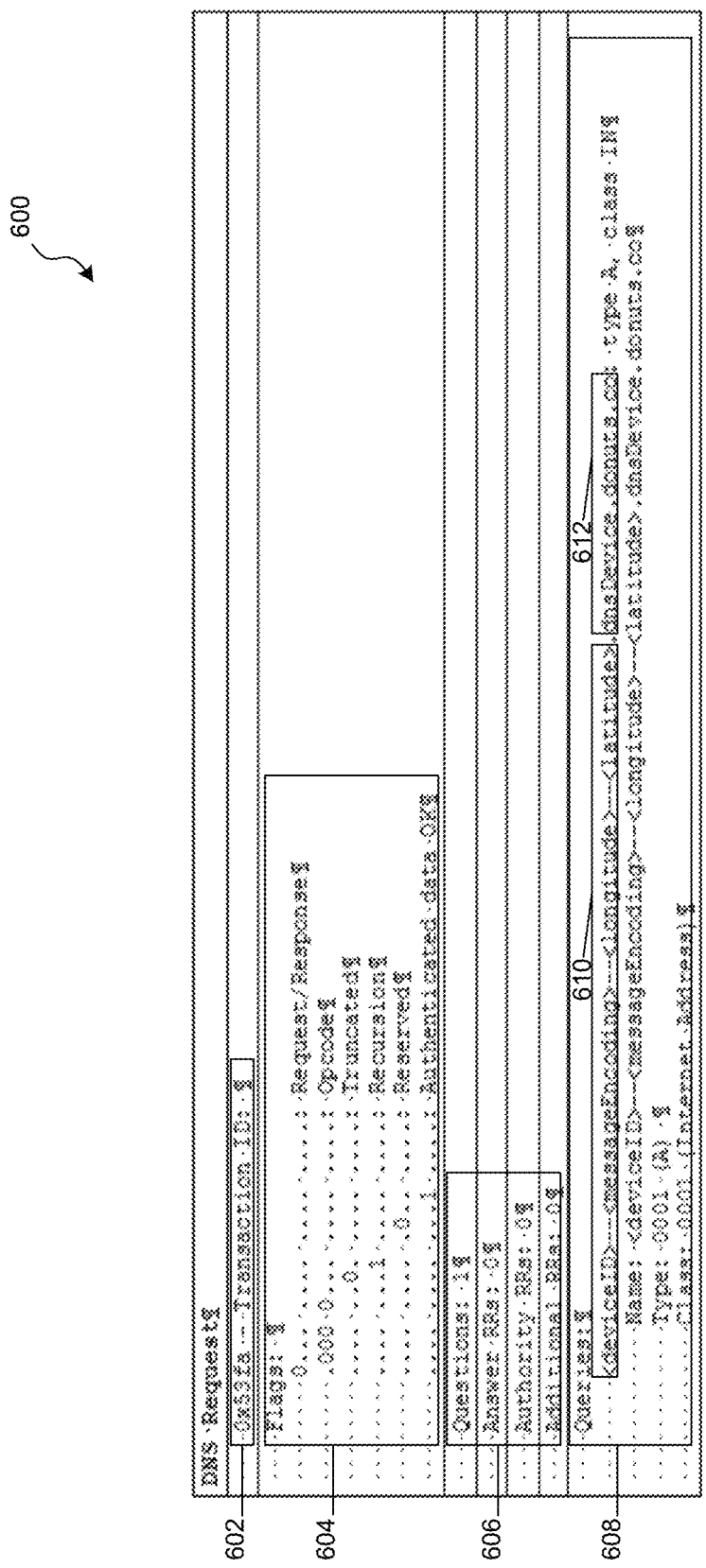
FIG. 6 is an example of a DNS message with embedded data.

FIG. 6 is an example 600 of a DNS message with embedded data. A standard DNS message includes a transaction ID 602, flags 604, additional data 606, and a questions or answers section 608. Corresponding portions 602, 604, and 606 in DNS messages with embedded data may be constructed as if this were a standard DNS message.

Embedded DNS messages change the question or answers section 608. As discussed above, a question portion 608 of a DNS request with embedded data may have an embedded message 610 followed by a query domain 612. The query domain 612 will be chosen such that the desired destination DNS server will receive the DNS request. The data to be communicated to the destination DNS server may then be included as the beginning 610 of the question 608. In example 600, the data to be communicated is a GPS location, and is encoded in message 610 with a device ID, an identification of the decoding algorithm to use, and the GPS coordinates.

Several embodiments of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but that various modifications may be made without deviating from the scope of the embodiments and implementations. The specific features and acts described above are disclosed as example forms of implementing the claims that follow. Accordingly, the embodiments and implementations are not limited except as by the appended claims.

We claim:

1. A method for communicating using embedded DNS messages performed by a computing system having one or more memories and one or more processors, the method comprising:
   selecting a query domain corresponding to a destination DNS server, wherein the destination DNS server is authoritative for an intermediary server for servicing DNS requests for the selected query domain;
   generating a message configured to be parsed from a DNS lookup request by the destination DNS server as data distinct from a DNS domain of the DNS lookup request, wherein the message comprises an identification of a parsing algorithm to use to extract data from the DNS lookup request; and
   generating the DNS lookup request, the DNS lookup request comprising a question that includes a combination of at least a portion of the generated message and the query domain.

2. The method of claim 1, further comprising:
   concatenating the generated message before a first character; and
   concatenating a string corresponding to the query domain after the first character.

3. The method of claim 1, further comprising:
   encoding the message into an encoded version with an encoding algorithm,
   wherein the destination DNS server has a parsing algorithm configured to extract the message from the encoded version.

4. The method of claim 1, wherein the message is further configured to be combined with the query domain to fit within a question portion of the DNS lookup request.

5. The method of claim 1, wherein the query domain of the DNS lookup request is used to route the DNS lookup request to a DNS server providing a mapping between the query domain and an IP address.

6. The method of claim 1, wherein the DNS lookup request is transmitted from one of:
   an ingestible or implanted device;
   a battery;
   a microphone;
   a video game controller;
   a plumbing fixture;
   a beacon;
   a wallet or electronic credit card;
   an irrigation system;
   a motion sensor; or
   a wall outlet.

7. The method of claim 1, wherein the message comprises instructions to the destination DNS server specifying that a response should be sent to a device other than the device that originated the DNS lookup request.

8. The method of claim 1, further comprising:
   in response to determining that the message is larger than a maximum size that may be embedded in a single DNS request,
   distributing the message across multiple DNS requests.

9. The method of claim 1, wherein the message comprises an identification of the device that originated the DNS lookup request.

10. The method of claim 1, further comprising:
    determining that the DNS lookup request is an embedded type of message.

11. The method of claim 1, wherein the generated message comprises GPS coordinates.

12. The method of claim 1, further comprising:
    sending a command to an appliance uniquely identified by an embedded message.

13. A computer-readable memory storing instructions configured to, when executed by a computing device, cause the computing device to perform a method comprising:
    selecting a query domain corresponding to a destination DNS server;
    generating a message configured to be parsed from a DNS lookup request by the destination DNS server as data distinct from a DNS domain of the DNS lookup request, wherein the message comprises an identification of a parsing algorithm to use to extract data from the DNS lookup request; and
    generating the DNS lookup request, the DNS lookup request comprising a question that includes a combination of at least a portion of the generated message and the query domain.

14. The computer-readable memory of claim 13, wherein the destination DNS server is authoritative for an intermediary server for servicing DNS requests for the selected query domain.

15. The computer-readable memory of claim 13, the method further comprising:
    receiving a DNS response;
    parsing an answer portion of the DNS response such that a reply message is retrieved; and
    storing the reply message.

16. The computer-readable memory of claim 13, wherein the DNS lookup request is transmitted from one of:
    a remote control device;
    a suitcase;
    a GPS sensing device;
    a food package or carton;
    a mail service letter or package;
    a vehicle;
    a fitness or personal health or activity tracker;
    a light bulb; or
    an HVAC system or control.

17. The computer-readable memory of claim 13, the method further comprising:
    in response to determining that the message is larger than a maximum size that may be embedded in a single DNS request,
    distributing the message across multiple questions in a single DNS requests.

18. The computer-readable memory of claim 13, wherein the message comprises instructions to the destination DNS server specifying that no response should be sent.

19. The computer-readable memory of claim 13, wherein the generated message comprises GPS coordinates.

20. A computing system, having one or more memories and one or more processors, for communicating using embedded DNS messages, the computing system comprising:
- a component configured to select a query domain corresponding to a destination DNS server, wherein the destination DNS server is authoritative for an intermediary server for servicing DNS requests for the selected query domain;
- a component configured to generate a message configured to be parsed from a DNS lookup request by the destination DNS server as data distinct from a DNS domain of the DNS lookup request, wherein the message comprises an identification of a parsing algorithm to use to extract data from the DNS lookup request; and
- a component configured to generate the DNS lookup request, the DNS lookup request comprising a question that includes a combination of at least a portion of the generated message and the query domain,
- wherein each of the components comprises computer-executable instructions stored in the one or more memories for execution by the computing system.

21. The computing system of claim 20, wherein the generated message comprises GPS coordinates.

* * * * *